United States Patent [19]

Mickols

[11] Patent Number: 5,755,964

[45] Date of Patent: May 26, 1998

[54] METHOD OF TREATING POLYAMIDE MEMBRANES TO INCREASE FLUX

[75] Inventor: William E. Mickols, Midland, Mich.

[73] Assignee: The Dow Chemical Company, Midland, Mich.

[21] Appl. No.: 595,707

[22] Filed: Feb. 2, 1996

[51] Int. Cl.$^6$ ................................................. B01D 39/00
[52] U.S. Cl. ............................... 210/500.37; 210/500.38; 210/490; 264/48
[58] Field of Search .................... 210/639, 500.37, 210/500.38, 490, 651, 652, 653, 654; 264/48, 49

[56] References Cited

U.S. PATENT DOCUMENTS

| | | | |
|---|---|---|---|
| 3,926,798 | 12/1975 | Cadotte | 210/23 |
| 3,992,495 | 11/1976 | Sanon et al. | 264/22 |
| 4,039,440 | 8/1977 | Cadotte | 210/23 H |
| 4,388,189 | 6/1983 | Kawaguchi et al. | 210/500.37 |
| 4,634,531 | 1/1987 | Nakagawa et al. | |
| 4,765,897 | 8/1988 | Cadotte et al. | |
| 4,812,238 | 3/1989 | Cadotte et al. | 210/636 |
| 4,812,270 | 3/1989 | Cadotte et al. | |
| 4,824,574 | 4/1989 | Cadotte et al. | |
| 4,964,998 | 10/1990 | Cadotte et al. | 210/654 |

FOREIGN PATENT DOCUMENTS

| | | | |
|---|---|---|---|
| 0474370 | 3/1992 | European Pat. Off. | 210/500.38 |
| 2266103 | 11/1987 | Japan | 210/500.38 |
| 271847 | 10/1988 | Japan | |
| 2115344 | 9/1983 | United Kingdom | 210/500.38 |

OTHER PUBLICATIONS

Derwent Abstracts, No. 83–21146K, Abstract of JP 58011005, Toray Ind. Inc., Jan. 21, 1983, "Treating Semi Permeable Membrane Comprising Crosslinked Polymer . . . ".

Primary Examiner—Ana Fortuna

[57] ABSTRACT

The flux of a composite reverse osmosis or nanofiltration membrane having a polyamide discriminating layer is enhanced in a one-step process in which the discriminating layer is treated with ammonia or certain alkylamines. It is possible to control both rejection rate and flux of the membrane as well as convert reverse osmosis membranes into nanofiltration membranes.

13 Claims, 2 Drawing Sheets

METHOD OF TREATING POLYAMIDE MEMBRANES TO INCREASE FLUX

FIELD OF INVENTION

This invention relates to a method of treating polyamide composite membranes with amines to increase the flux or flow rate through the membranes in a filtration operation.

BACKGROUND

Reverse osmosis or nanofiltration membranes are used to separate dissolved or dispersed materials from a solvent or a dispersing medium, generally water. This is accomplished because the membranes are selectively permeable to certain components of the mixture to be separated. Usually, water is the component to which such membranes are permeable. The separation process typically involves bringing an aqueous feed solution into contact with one surface of the membrane under pressure so as to effect permeation of the aqueous phase through the membrane while permeation of the dissolved or dispersed materials is prevented.

Both reverse osmosis and nanofiltration membranes usually have a discriminating layer fixed to a porous support and are referred to as composite membranes. The support provides physical strength but offers little resistance to the flow rate due to its porosity. On the other hand, the discriminating layer is less porous and provides for the rejection of the dissolved or dispersed materials. Therefore, it is generally the discriminating layer which determines the rejection rate, i.e., the percentage of the particular dissolved material that is rejected, and the flux, i.e., the flow rate at which solutions pass through the membrane.

Reverse osmosis membranes and nanofiltration membranes vary from each other with respect to their degree of impermeability to different ions and organic compounds. Reverse osmosis membranes are relatively impermeable to virtually all ions, including sodium chloride. Therefore, reverse osmosis membranes are widely used for the desalination of brackish water or seawater to provide relatively non-salty water for industrial, commercial, or domestic use because the rejection rate of NaCl for reverse osmosis membranes is usually from about 95 to about 100 percent.

On the other hand, nanofiltration membranes are usually more specific for the rejection of ions. Generally, nanofiltration membranes reject divalent ions, including radium, magnesium, calcium, sulfate, and nitrate. In addition, nanofiltration membranes are generally impermeable to organic compounds having molecular weights above about 200. Additionally, nanofiltration membranes generally have higher fluxes than reverse osmosis membranes. These characteristics render nanofiltration membranes useful in such diverse applications as the "softening" of water and the removal of pesticides from water. As an example, nanofiltration membranes generally have a NaCl rejection rate of from about 0 to about 95 percent but have a relatively high rejection rate for salts such as magnesium sulfate and organic compounds such as atrazine.

Among particularly useful membranes for reverse osmosis and nanofiltration applications are those in which the discriminating layer is a polyamide. The polyamide discriminating layer for reverse osmosis membranes is often obtained by an interfacial polycondensation reaction between a polyfunctional aromatic amine and a polyfunctional acyl halide as described in, for example, U.S. Pat. No. 4,277,344.

In contrast to reverse osmosis membranes, the polyamide discriminating layer for nanofiltration membranes is typically obtained via an interfacial polymerization between a piperazine or an amine substituted piperidine or cyclohexane and a polyfunctional acyl halide as described in U.S. Pat. Nos. 4,769,148 and 4,859,384. Another way of obtaining polyamide discriminating layers suitable for nanofiltration is via the methods described in, for example, U.S. Pat. Nos. 4,765,897; 4,812,270; and 4,824,574. These patents describe changing a reverse osmosis membrane, such as those of U.S. Pat. No. 4,277,344, into a nanofiltration membrane. The process requires contacting the reverse osmosis polyamide discriminating layer with a strong mineral acid such as phosphoric acid and then with a rejection enhancing agent such as tannic acid colloid. Unfortunately, the membranes of this process cannot be made in a continuous fashion. This is because if residual acid is present on the membranes then then the membrane processing equipment, such as dryers, will be harmed.

In order for both reverse osmosis and nanofiltration composite membranes to be of commercial significance, it is desirable that said membranes have a reasonably high rejection characteristic for the dissolved or dispersed material being separated from the solvent, and have a high flux or flow rate at a reasonable transmembrane pressure. At higher fluxes, a greater volume of purified solvent may be obtained in the same amount of time without increasing the pressure. Thus, membranes having both a high rejection characteristic for a particular substance and a high flux are desirable for most applications.

Various treatments to polyamide membranes have been employed in order to increase their performance in water purification applications. U.S. Pat. No. 4,634,531 discloses the treatment of membranes by contacting them with two kinds of very dilute aqueous solutions. The first solution is typically an amine. The second solution is an aldehyde. The treatment is cumbersome in that it requires the use of two different solutions. The result of the treatment is that the rejection capability of the membrane is increased somewhat but the flux is either hindered or unaffected. JP Patent Application J02002827 contemplates treating polyamide reverse-osmosis membranes with a wide variety of water-soluble amino compounds. However, the treatment results in lower fluxes with the particular amines employed.

It would be advantageous if a treatment for polyamide discriminating layers could be found which would increase the flow rate therethrough without increasing the pressure or would maintain the flow rate therethrough when the pressure is reduced. It would further be advantageous if the treatment involved a one-step application of a solution that was not corrosive. It would further be advantageous if the rejection rate for particular ions could be controlled such that a reverse osmosis membrane could be changed into a nanofiltration membrane or a reverse osmosis membrane's flux could be increased while substantially maintaining the rejection rate for NaCl.

SUMMARY OF THE INVENTION

A one-step method of increasing the flux of a composite membrane having a polyamide discriminating layer has been discovered. The method consists essentially of contacting the discriminating layer with an amine from the group consisting of ammonia; ammonia substituted with one to three alkyl groups of one to two carbons which alkyl groups may be further substituted with one or more substitutents selected from hydroxy, phenyl, or amino; butylamine; cyclohexylamine; 1,6-hexanediamine and mixtures thereof under conditions such that the flux of the membrane is increased at least about 10 percent. The rejection rate and flux of a membrane prepared with the above-treated discriminating layers may be controlled by varying the amine, the concentration of the amine, the time of contact, the temperature of the contact and the pH of the amine solution. By controlling the rejection rate and flux, a reverse osmosis membrane may be converted into a nanofiltration membrane. A reverse osmosis membrane's flux may also be increased while substantially maintaining the rejection rate for NaCl.

DETAILED DESCRIPTION OF THE INVENTION

Figure 1:
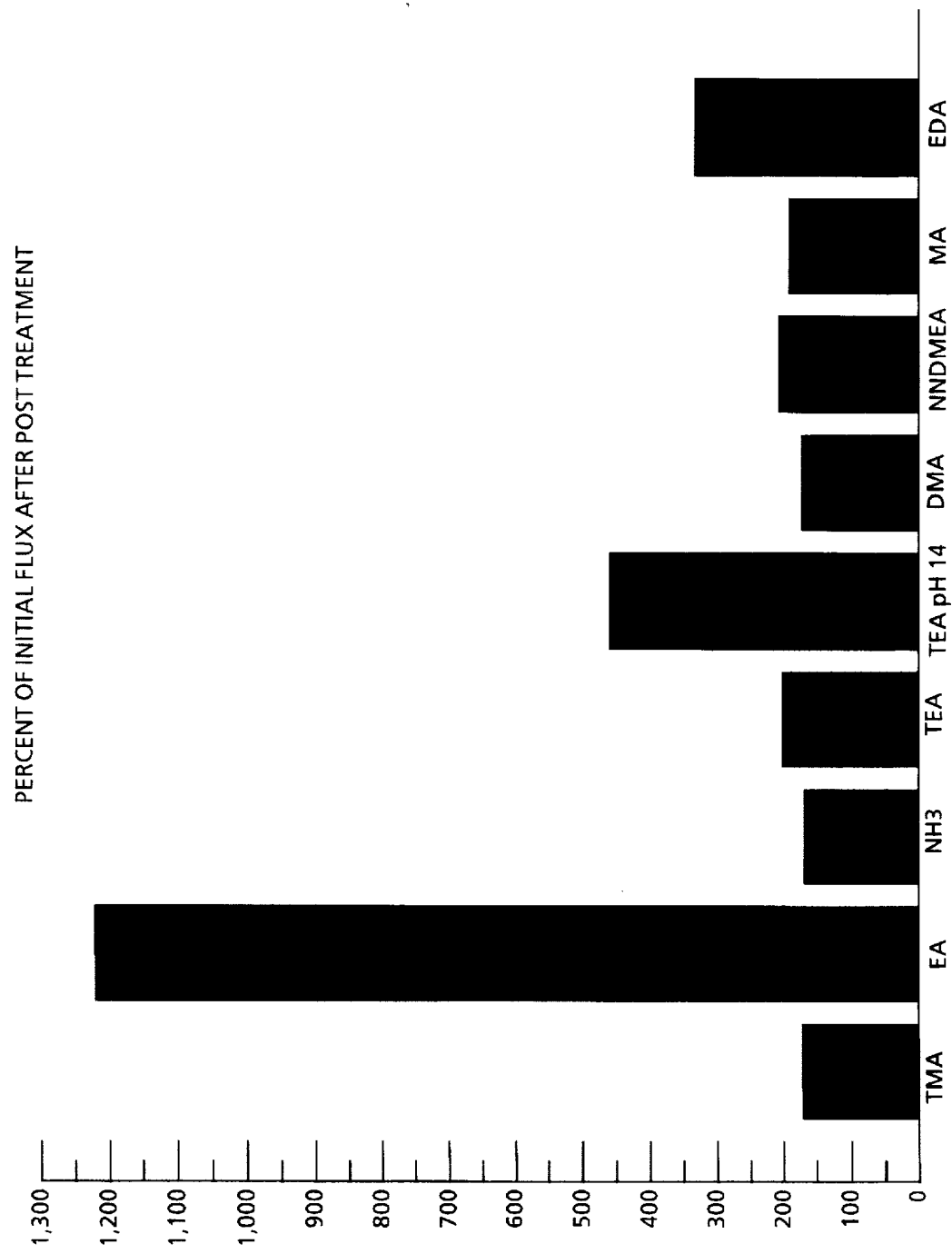
FIG. 1 shows the increase of flux in percent on the vertical axis after treatment with various amines (an untreated membrane control is shown as having 100 percent flux).
Figure 2:
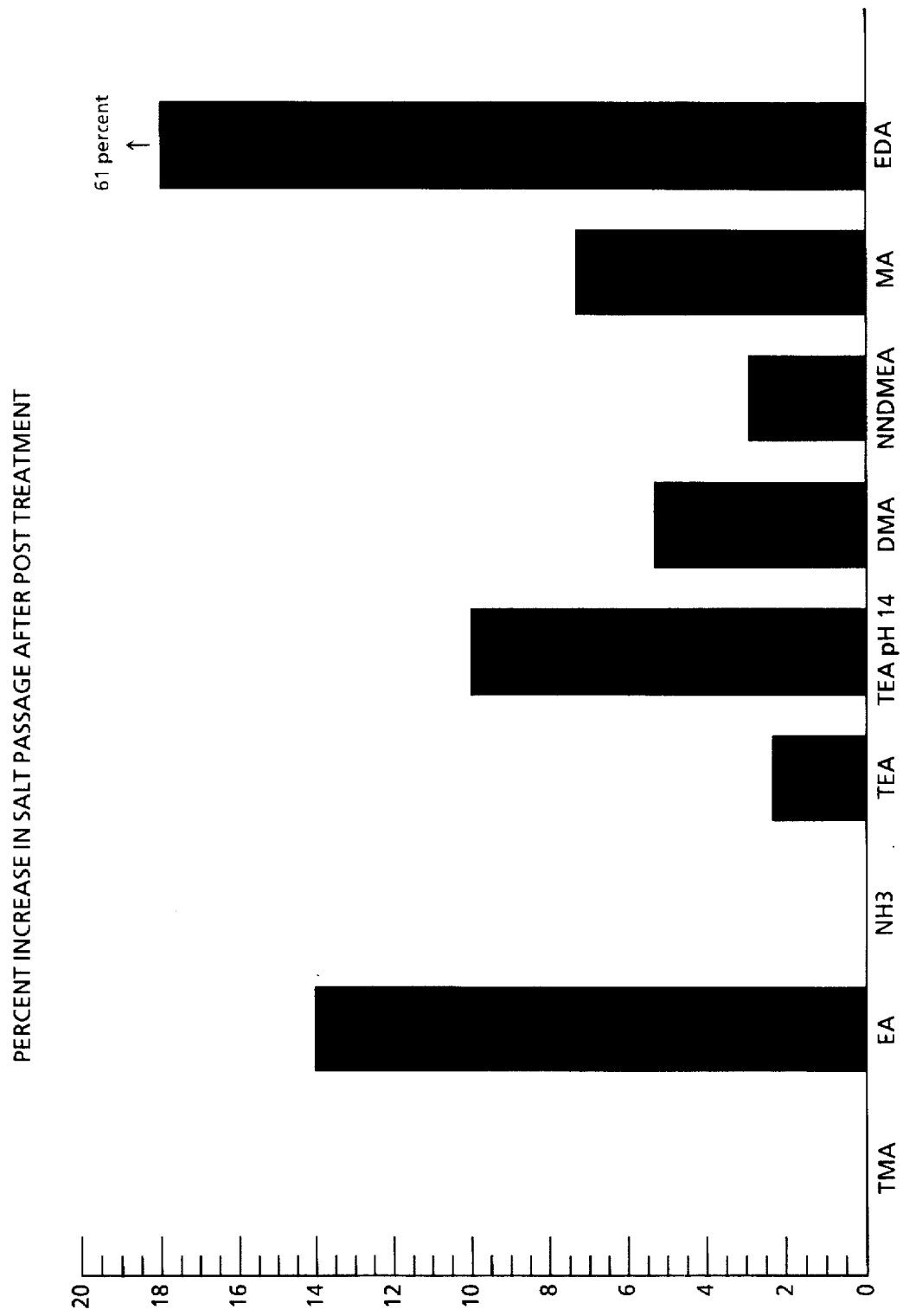
FIG. 2 shows the percent increase in salt, i.e. NaCl, passage (SP). The amines employed were trimethylamine (TMA), ethanolamine (EA), ammonia ($NH_3$), triethanolamine (TEA), TEA at a high pH of 14, dimethylamine (DMA), N,N-dimethyl ethanolamine (NNDMEA), methylamine (MA), and ethylenediamine (EDA).

As used herein "rejection rate" is the percentage of a particular dissolved material which does not flow through the membrane with the solvent. The rejection rate is equal to 100 minus the percentage of dissolved material which passes through the membrane, i.e. salt passage if the dissolved material is a salt.

As used herein "flux" is the flow rate at which solutions pass through the membrane.

As used herein "reverse osmosis membrane" is a membrane which has a rejection rate for NaCl of from about 95 to about 100 percent.

As used herein "nanofiltration membrane" is a membrane which has a rejection rate for NaCl of from about 0 to about 95 percent and has a rejection rate for at least one divalent ion or organic compound of from about 90 to about 100 percent.

As used herein "divalent ion" is an ion that has lost or gained two electrons and thus has an electric charge of (+2) or (−2). Such ions exist in water solutions upon the addition of inorganic salts. Examples of divalent ions include magnesium ions ($Mg^{+2}$), calcium ions ($Ca^{+2}$), radium ions ($Ra^{+2}$), sulfate ions ($SO_4^{-2}$), and nitrate ions ($NO_3^{-2}$).

As used herein "organic compounds" denotes compounds containing carbon and having a molecular weight above about 200 which may be rejected by a nanofiltration membrane. Examples of organic compounds include pesticides such as atrazine, monosaccharides such as glucose, chlorinated hydrocarbons, peptides, and soaps containing long chain hydrocarbons.

As used herein "polyamide" is a polymer in which amide linkages (—C(O)NH—) occur along the molecular chain.

Amines useful in this invention include substances such as ammonia optionally substituted with one or more alkyl groups of one to two carbons which alkyl groups may be further optionally substituted with one or more substitutents selected from hydroxy, phenyl, or amino; butylamine; cyclohexylamine; 1,6-hexanediamine and mixtures thereof. Preferred substituted ammonia substances include those such as dimethylamine; trimethylamine; ethylamine; triethanolamine; N,N-dimethyl ethanolamine; ethylenediamine; and benzylamine.

It has been discovered that by contacting the above amines with the discriminating layer of reverse osmosis or nanofiltration composite membranes in which the discriminating layer comprises a crosslinked polyamide polymer, the flux is increased and the rejection rates for particular substances may be changed. Polyamide polymers useful as discriminating layers for reverse osmosis membranes are typically prepared by an interfacial polycondensation reaction between a polyfunctional aromatic amine and a polyfunctional acyl halide as described, for example, in U.S. Pat. No. 4,277,344. Polyamide polymers useful as discriminating layers for nanofiltration membranes are typically prepared by an interfacial polymerization between a piperazine or an amine substituted piperidine or cyclohexane and a polyfunctional acyl halide as described in U.S. Pat. Nos. 4,769,148 and 4,859,384. Another method of preparing polyamide membranes suitable for nanofiltration is by modifying reverse osmosis membranes by the methods and procedures of U.S. Pat. Nos. 4,765,897; 4,812,270; and 4,824,574. These patents involve contacting the reverse osmosis membrane with a strong mineral acid and then a rejection enhancing agent to form the nanofiltration membrane.

It is not particularly important when the polyamide discriminating layer is contacted with the amine so long as the polyamide discriminating layer has been formed. For instance, the contacting of the amine with the discriminating layer may be accomplished before the preparation of the discriminating layer into final membrane form. That is the contacting of the amine with the polyamide discriminating layer may be employed after the polyamide has been formed but before the support has been affixed. Likewise, the contacting of the amine can be done after the discriminating layer is in its final composite membrane form, as in the case when the membrane is formed directly on the support. The contacting of the amine with the polyamide discriminating layer can even be employed after the composite membrane has been accomplished in a filtration operation as long as the membrane is still operable.

If the membrane is to be contacted after it is in final membrane form, then the shape and composition of the membrane should be such that the polyamide discriminating layer is capable of being contacted with the above-described amine compounds. A variety of membrane shapes are commercially available and useful in the present invention. These include spiral wound, hollow fiber, tubular, or flat sheet type membranes. In regard to the composition of the membrane, often the discriminating layer has hygroscopic polymers other than the polyamide coated upon the surface of the discriminating layer. Among these polymers are polymeric surfactants, polyvinyl alcohol, and polyacrylic acid. The presence of these polymers will generally not affect the invention so long as the amine and the polyamide discriminating layer come into contact.

Likewise, the material of construction of the porous support of the composite membrane is not critical to the invention. Any porous support that provides physical strength to the discriminating layer may be employed. Typical support materials that are known in the art include cellulose esters, polysulfones, polyether sulfones, polyvinyl chloride, chlorinated polyvinyl chloride, polystyrenes, polycarbonates, polyacrylonitriles, and polyesters. A particularly preferred class of support materials are polysulfones. Preparation of such supports are described in U.S. Pat. Nos. 3,926,798; 4,039,440; and 4,277,344.

In most polyamide membranes, as the flux that the membrane is capable of increases, the rejection rate for ions decreases, i.e., the membrane becomes less selective. This invention may be used in this manner to convert a reverse osmosis membrane into a nanofiltration membrane. This is generally accomplished as disclosed below by contacting the discriminating layer with the disclosed amines under sufficient conditions, for example, for a long enough period of time and a high enough concentration, to increase the flux and alter the rejection rate. However, the invention may also be used to increase the flux of a reverse osmosis membrane and substantially maintain the rejection rate for NaCl, i.e., not lower the rejection rate for NaCl more than 10 percent, preferably not more than 5 percent, more preferably not more than 2 percent. This is accomplished via contacting the discriminating layer with the disclosed amines, but varying either the amine employed, the concentration, the time of contact, the temperature of contact, the pH, or combinations thereof from that used when changing a reverse osmosis membrane to a nanofiltration membrane. The general guidelines provided below will enable one skilled in the art to utilize the invention without undue experimentation to either change a reverse osmosis membrane to a nanofiltration membrane or increase the flux of a reverse osmosis membrane and substantially maintain the rejection rate for NaCl.

As mentioned above, the degree that the flux of the membrane is increased or enhanced may be controlled by varying the particular amine employed, the concentration of the amine, the time of contact between the discriminating layer and amine, the temperature of the contact, the pH of the amine solution, or combinations thereof. In general the above conditions should be such that the flux of the membrane is increased at least about 10 percent, preferably at least about 20 percent, most preferably at least 50 percent. As the flux is increased, the selectivity of the membrane may change, i.e., the membrane may allow univalent ions such as sodium to pass through the membrane at a higher rate while only rejecting divalent ions and organic compounds.

The amine used to treat the polyamide discriminating layer may be in solution, neat, or even a gas phase so long as it can be contacted with the polyamide. Gas phases may typically be employed for lower molecular weight amines such as ammonia, methylamine, and dimethylamine.

The solvent may be any solvent in which the amine is soluble so long as the flux enhancement and the performance of the membrane is not hindered by contact with the solvent. Typical solvents may include water and organic compounds such as alcohols and hydrocarbons provided the support is not dissolved by the solvent. Generally, because of its ease of handling and its availability, water is employed if a solvent is desired.

The extent that the flux of the membrane is enhanced when treated with the amines of this invention varies depending upon the particular amine employed. At least one general trend applies in most situations, however. The trend being that the more functional groups which are present on the amine, e.g., alcohol and/or amino groups, the greater the increase in flux.

Correspondingly, the concentration of the amine and time of contact are interrelated and effect the degree of flux enhancement. The minimum length of time that a particular amine is required to be contacted with the discriminating layer for an increase in flux depends to a great extent upon the concentration of the amine. Generally, the higher the concentration of the amine, the shorter the necessary length of contacting time to increase the flux. In most cases, the concentration of the amine should be at least about 5, preferably at least about about 20, most preferably at least about 50, to about 100 percent by weight. The minimum time of contact can be from at least about 15 seconds, preferably at least about one minute, more preferably at least about 30 minutes when contacted at ambient temperatures.

In general, the longer the time of contact and the higher the concentration of the amine, the greater the increase in flux. After a prolonged time of contact, the flux will reach its maximum increase and no longer increase. At this point, the membrane may be used or continued to be stored in the amine. The time to reach the maximum increase varies depending upon the particular amine employed, the concentration of the amine, and the temperature of contact but is ascertainable by one skilled in the art without undue experimentation by utilizing the general trends disclosed above. For most amines and concentrations, the flux of the membrane will be maximized once the discriminating layer has been contacted for about 5 days with the amine.

If it is desired to shorten the minimum length of time of contact, then the surface temperature of the polyamide discriminating layer may be increased. Although this applies generally, it is particularly advantageous if low concentrations of an amine which might require a long contacting time are being employed. Although temperatures from about 0° to about 30° C. are most conveniently used, increased temperatures may shorten the necessary contacting time. The increased temperatures should not be so high that the membrane's performance is reduced, i.e., not above about 130° C. Typical temperatures which will hasten the flux effect of the membrane are at from at least about 30° C., preferably at least about 60° C. to about 130° C. These temperatures may be reached by contacting the amine with the polyamide discriminating layer in a device such as an oven or a dryer. Typical ovens or dryers which may be employed include convection, infrared, or forced air dryers.

The pH of the amine solution to be contacted with the polyamide is not a critical aspect of the invention. However, the pH should not be so low that the particular amine being employed precipitates out of solution. On the other hand, the pH should not be so high that the polyamide discriminating layer is degraded or performance is negated. Preferably, a pH of about 7 to about 12 is useful in the method of the present invention and for some amines higher pHs may increase the degree of flux enhancement.

The method used to contact the amine with the discriminating layer may be any which allows the amine to become associated with the polyamide for a sufficient time to increase the flux. For instance, the polyamide may be partially or totally immersed or soaked in the amine or amine solution. The amine or amine solution may also be passed through, sprayed onto, or rolled onto the discriminating layer. Although the aforementioned methods may also be useful when the amine is a gas, the contacting of a gaseous amine with the discriminating layer is advantageously accomplished in a closed vessel to minimize the amount of amine employed.

EXAMPLES

Example 1

Reverse osmosis membranes (FT-30™ available from FilmTec Corporation) are contacted with triethanolamine of various aqueous concentrations at 60° C. as shown in Table 1 for 1 hour. The membranes are then stored in water at room temperature until tested for flux, as measured in both gallons per foot per day (gfd) and liters per meter square per hour ($L/m^2$-hr), and percent salt passage (100-rejection rate) using 2000 parts per million (ppm) aqueous sodium chloride (NaCl) solution and a transmembrane pressure of 225 pounds per square inch (psi) which is 1.55 MegaPascals (MPa). The results are shown in Table 1.

TABLE 1

Performance When Contacted With Different Concentrations of Triethanolamine (TEA) for 1 Hour at 60° C.

| Treatment (volume percent) | Flux gfd | Flux L/m²-hr | Flux Std. Dev. gfd | Flux Std. Dev. L/m²-hr | % Salt Pass. | % Salt Pass. Std. Dev. | Rejection Rate (%) |
|---|---|---|---|---|---|---|---|
| 100% TEA | 62.35 | 36.68 | 7.79 | 4.58 | 8.99 | 6.24 | 91.01 |
| 66% TEA | 48.03 | 28.25 | 0.34 | 0.20 | 2.33 | 0.14 | 97.67 |
| Starting Membrane | 36.44 | 21.44 | 0.87 | 0.51 | 1.54 | 0.49 | 98.46 |

Example 2

Reverse osmosis membranes (FT-30™ available from FilmTec Corporation) are contacted with 100 percent triethanolamine at 60° C. for various amounts of time as shown in Table 2. The membranes are then stored in water at room temperature until tested for flux and percent salt passage using a 2000 ppm aqueous NaCl solution and a transmembrane pressure of 225 psi which is 1.55 MPa. The results are shown in Table 2.

TABLE 2

Performance When Contacted With 100% Triethanolamine (TEA) for Different Amounts of Time at 60° C.

| Length of Treatment | Flux gfd | Flux L/m²-hr | Flux Std. Dev. gfd | Flux Std. Dev. L/m²-hr | % Salt Pass. | Rejection Rate (%) | % Salt Pass. Std. Dev. |
|---|---|---|---|---|---|---|---|
| 60 min. | 61.54 | 36.20 | 3.17 | 1.86 | 1.75 | 98.25 | 0.12 |
| 40 min. | 60.11 | 35.36 | 4.58 | 2.70 | 1.98 | 98.02 | 0.47 |
| 20 min. | 55.8 | 32.82 | 1.15 | 0.68 | 2.10 | 97.90 | 0.17 |
| Starting Membrane | 37.77 | 22.22 | 3.40 | 2.00 | 1.45 | 98.55 | 0.19 |

Example 3

Reverse osmosis membranes (FT-30™ available from FilmTec Corporation) are contacted with one molar solution of butylamine, cyclohexylamine, 1,6-hexanediamine and benzylamine for five days at 25° C. Reverse osmosis membranes (FT-30™ available from FilmTec Corporation) are contacted with one molar solution of 1,6-hexanediamine and benzylamine for one day at 25° C. The above treated membranes are then stored in water at room temperature until tested for flux and percent salt passage using 2000 ppm aqueous NaCl solution and transmembrane pressure of 225 psi which is 1.55 MegaPascals (MPa). The results are shown in Table 3a and 3b.

TABLE 3a

| | 5 Days Flux gfd | 5 Days Flux L/m²-hr | % Salt Pass. | Rejection Rate | % of Initial Flux |
|---|---|---|---|---|---|
| Starting Membrane | | | | | |
| Average | 37.4905 | 22.0532 | 1.502 | 98.498 | |
| Std Dev | 1.4095 | 0.8291 | 0.112 | | |
| butyl amine | | | | | |
| Average | 48.3086 | 28.4168 | 2.766 | 97.234 | 128.86% |
| Std Dev | 3.77934 | 2.22314 | 0.124 | | |
| cyclo hexyl amine | | | | | |
| Average | 51.4335 | 30.2550 | 4.931 | 95.069 | 137.19% |
| Std Dev | 5.32809 | 3.13417 | 0.349 | | |
| 1,6-hexane diamine | | | | | |
| Average | 49.1316 | 28.9009 | 3.158 | 96.842 | 131.05% |
| Std Dev | 3.4174 | 2.0102 | 0.390 | | |
| benzyl amine | | | | | |
| Average | 62.0229 | 36.4841 | 9.051 | 90.949 | 165.44.% |
| Std Dev | 1.2882 | 0.7578 | 1.186 | | |

TABLE 3b

| | One Day | | |
|---|---|---|---|
| | 1 Day Flux gfd | 1 Day Flux L/m²-hr | % Salt Pass. | Rejection Rate |
| Starting Membrane | | | | |
| Average | 36.2623 | 21.3308 | 1.07879 | 98.92121 |
| Std Dev | 1.52969 | 0.89981 | 0.08724 | |
| 1,6-hexane diamine | | | | |
| Average | 40.9509 | 24.0888 | 1.12219 | 98.7781 |
| Std Dev | 2.92659 | 1.72152 | 0.02112 | |
| benzyl amine | | | | |
| Average | 43.2974 | 25.4691 | 3.35476 | 96.64524 |
| Std Dev | 4.40101 | 2.58882 | 0.09992 | |

Example 4

Reverse osmosis membranes (FT-30™ available from FilmTec Corporation) are contacted with 100 percent triethanolamine at 60° C. for various amounts of time as shown in Table 4. The membranes are then tested for flux and percent passage using a 2000 ppm aqueous NaCl solution, a 1000 ppm aqueous MgSO₄ solution, a 0.5 percent aqueous glucose solution, and a transmembrane pressure of 120 psi which is 0.83 MegaPascals (MPa). The results are shown in Table 4.

stored in water at room temperature until tested for flux and percent salt passage using a 2000 ppm aqueous NaCl solution and a transmembrane pressure of 225 psi. The results are shown in Table 5.

TABLE 5

| | Flux | Flux L/m²-hr | % Salt Pass. | Rejection Rate |
|---|---|---|---|---|
| starting membrane | | | | |
| Average | 44.8122 | 26.3601 | 32.777 | 67.223 |
| Std Dev | 1.71086 | 1.00639 | 20.241 | |
| TEA at 60° C. 1 hr. | | | | |
| Average | 94.6887 | 55.6992 | 33.194 | 66.806 |
| Std Dev | 13.5823 | 7.9896 | 3.864 | |

Example 6

Reverse osmosis membranes (FT-30™ available from FilmTec Corporation) are contacted with the various solu-

TABLE 4

| Length of Treatment with TEA | NaCl Salt Pass. | NaCl Rejection Rate | Flux gfd | Flux L/m²-hr | MgSO₄ Salt Pass. | MgSO₄ Rejection Rate | Glucose Pass. | Glucose Rejection Rate | Std. Dev. glucose |
|---|---|---|---|---|---|---|---|---|---|
| 10 min | 3.33% | 96.67% | 25.61976 | 15.07044 | 0.0% | 100.0% | 2.81% | 97.19% | 0.36% |
| 10 min | 5.05% | 94.95% | 36.5628 | 21.5075 | 0.0% | 100.0% | 2.57% | 97.43% | 0.14% |
| 30 min | 7.57% | 92.43% | 44.62176 | 26.24809 | 0.31% | 99.69% | 3.76% | 96.24% | 0.08% |
| 30 min | 6.75% | 93.25% | 39.15984 | 23.03520 | 3.70% | 96.30% | 4.95% | 95.05% | 0.22% |
| 120 min | 11.91% | 88.09% | 54.29148 | 31.93616 | 0.26% | 99.74% | 4.90% | 95.10% | 0.08% |
| 120 min | 13.22% | 86.78% | 55.4616 | 32.6245 | 0.0% | 100.0% | 2.81% | 97.19% | 0.16% |
| Starting Membrane | 3.31% | 96.69% | 23.68992 | 13.93524 | 0.70% | 99.30% | 3.28% | 96.72% | 0.29% |
| Starting Membrane | 3.15% | 96.85% | 22.50492 | 13.23819 | 1.12% | 98.88% | 11.64% | 88.32% | 0.12% |

Example 5

A nanofiltration membrane (NF-45™ available from FilmTec Corporation) is contacted with 100 percent triethanolamine at 60° C. for one hour. The membrane is then tions in Table 6 for 20 minutes at 90° C. Each of the three membranes is then tested to determine the rejection rate of atrazine, magnesium sulfate (MgSO₄) calcium chloride (CaCl₂), and sodium chloride (NaCl) using the transmembrane pressures and concentrations listed in Table 6. The results are shown in Table 6.

TABLE 6

| | 130 psi (.90 MPa) | | | | 130 psi (.90 MPa) CaCl2 300 ppm | | | 250 psi (1.7 MPa) 2000 ppm NaCl | | |
|---|---|---|---|---|---|---|---|---|---|---|
| | 10 ppm Atrazine | 2000 ppm MgSO4 | | | | | | | | |
| | Rejection rate % | Rejection rate % | Flux (gfd) | Flux L/m²-hr | Rejection rate % | Flux (gfd) | Flux L/m²-hr | Rejection rate % | Flux (gfd) | Flux L/m²-hr |
| 4% NaOH, 70% TEA, pH 13.25 | 74.5, 68.3 | 99.6, 99.6 | 68.5, 60.8 | 40.3, 35.8 | 93.6, 95.9 | 113, 128 | 66.5, 75.3 | 69.9, 66.3 | 126, 141 | 74.1, 82.9 |
| 1.8% NaOH, 70% TEA, pH 12.55 | 85.8, 85.1 | 99.6, 99.6 | 56.8, 56.3 | 33.4, 33.1 | 98.1, 98.4 | 105, 105 | 61.8, 61.8 | 80.92, 79 | 115, 113 | 67.6, 66.5 |
| 100% TEA, pH 10.44 | 91.6, 93.2 | 99.6, 99.9 | 48.7, 47.9 | 28.6, 28.2 | 99.2, 98.5 | 94.2, 88.5 | 55.4, 52.1 | 87.8, 86.5 | 96, 103 | 56.5, 60.6 |

Example 7

Reverse osmosis membranes (FT-30 available from FilmTec Corporation) are contacted with a 50 percent solution of triethanol amine (TEA) for 20 minutes at both 50° C. and 70° C. as shown in Table 7. The average flux and average rejection rate as measured with a transmembrane pressure of 150 psi and a 2000 ppm. NaCl solution are shown in Table 7 below.

TABLE 7

|  | Flux (gfd) | Flux (L/m$^2$-hr) | Rejection Rate NaCl |
|---|---|---|---|
| 50° C. | 29.09 | 17.11 | 98% |
| 70° C. | 49.23 | 28.96 | 89% |

What is claimed is:

1. A method of increasing the flux of a composite membrane having a polyamide discriminating layer which consists essentially of contacting the discriminating layer with an amine from the group consisting of ammonia; ammonia substituted with one to three alkyl groups of one to two carbons, said alkyl groups may be further substituted with one or more substituents selected from hydroxy, phenyl, or amino groups; butylamine; cyclohexylamine; 1,6 hexane diamine and mixtures thereof, wherein the concentration of the amine, whether in solution, neat or in liquid or gas phase, is at least about 5 percent by weight, under conditions such that the flux is increased at least 10 percent.

2. The method of claim 1 wherein the amine is ammonia; dimethylamine; trimethylamine; ethylamine; triethanolamine; N,N-dimethyl ethanolamine; ethylenediamine; benzylamine; or mixtures thereof.

3. The method of claim 2 wherein the amine is triethanolamine.

4. The method of claim 1 wherein the amine is in liquid or gas phase.

5. The method of claim 1 wherein the discriminating layer is contacted with the amine for a period of from about 15 seconds to about 5 days.

6. The method of claim 1 wherein the discriminating layer is contacted with the amine at a temperature of from about 0° C. to about 130° C.

7. The method of claim 1 wherein the discriminating layer is dried at a temperature of from about 60° to about 80° C. after contact with the amine.

8. The method of claim 1 wherein the pH of the amine is from about 7 to about 12.

9. The method of claim 1 wherein the contacting is accomplished by spraying, rolling, or immersing.

10. The method of claim 1 wherein the concentration of the amine is 100 percent.

11. The method of claim 1 wherein the composite membrane is a reverse osmosis membrane or a nanofiltration membrane.

12. The method of claim 1 wherein the composite membrane is a reverse osmosis membrane and the conditions are such that the reverse osmosis membrane is changed to a nanofiltration membrane.

13. The method of claim 1 wherein the composite membrane is a reverse osmosis membrane and the conditions are such that the rejection rate is substantially maintained.

* * * * *